United States Patent
Mason et al.

(10) Patent No.: US 10,593,437 B2
(45) Date of Patent: Mar. 17, 2020

(54) METHODS FOR TREATMENT OF RADIOACTIVE ORGANIC WASTE

(71) Applicant: Studsvik, Inc., Atlanta, GA (US)

(72) Inventors: J. Bradley Mason, McCall, ID (US); Walter Scott Roesener, Mabelton, GA (US)

(73) Assignee: Studsvik, Inc., Atlanta, GA (US)

( * ) Notice: Subject to any disclaimer, the term of this patent is extended or adjusted under 35 U.S.C. 154(b) by 0 days.

(21) Appl. No.: 16/227,848

(22) Filed: Dec. 20, 2018

(65) Prior Publication Data

US 2019/0122779 A1   Apr. 25, 2019

Related U.S. Application Data

(62) Division of application No. 14/609,738, filed on Jan. 30, 2015.

(51) Int. Cl.

| | |
|---|---|
| *G21F 9/00* | (2006.01) |
| *G21F 9/02* | (2006.01) |
| *G21F 9/12* | (2006.01) |
| *G21F 9/30* | (2006.01) |
| *G21F 9/32* | (2006.01) |
| *B01D 39/20* | (2006.01) |
| *B01D 53/04* | (2006.01) |
| *B01J 8/08* | (2006.01) |
| *B01J 8/18* | (2006.01) |
| *B01J 8/24* | (2006.01) |
| *F23G 7/06* | (2006.01) |

(52) U.S. Cl.
CPC ........... *G21F 9/00* (2013.01); *B01D 39/2034* (2013.01); *B01D 39/2075* (2013.01); *B01D 53/04* (2013.01); *B01J 8/087* (2013.01); *B01J 8/1836* (2013.01); *B01J 8/24* (2013.01); *F23G 7/061* (2013.01); *G21F 9/02* (2013.01); *G21F 9/12* (2013.01); *G21F 9/30* (2013.01); *G21F 9/32* (2013.01); *B01D 2257/20* (2013.01); *B01D 2257/30* (2013.01); *B01D 2258/02* (2013.01); *B01D 2259/40001* (2013.01); *B01J 2208/00017* (2013.01); *B01J 2208/00823* (2013.01)

(58) Field of Classification Search
CPC ..... G21F 9/00; G21F 9/02; G21F 9/12; G21F 9/30; G21F 9/32; B01D 39/2034; B01D 39/2075; B01D 53/04; B01D 2257/20; B01D 2257/30; B01D 2258/02; B01D 2259/40001; B01J 8/087; B01J 8/1836; B01J 8/24; B01J 2208/00017; B01J 2208/00823; B23G 7/061
USPC ......................................................... 588/19
See application file for complete search history.

(56) References Cited

U.S. PATENT DOCUMENTS

| | | | |
|---|---|---|---|
| 2,513,022 | A | 6/1950 | Helmers et al. |
| 2,539,466 | A | 1/1951 | Parry |
| 2,619,415 | A | 11/1952 | Hemminger |
| 2,633,416 | A | 3/1953 | Gornowski et al. |
| 2,680,065 | A | 6/1954 | Atwell |
| 2,683,657 | A | 7/1954 | Garbo |
| 2,772,954 | A | 12/1956 | Jequier |
| 2,979,390 | A | 4/1961 | Garbo |
| 3,522,019 | A | 7/1970 | Buswell et al. |
| 3,624,176 | A | 11/1971 | Lhonore et al. |
| 3,737,291 | A | 6/1973 | Lhonore et al. |
| 3,861,885 | A | 1/1975 | Schora |
| 3,907,674 | A | 9/1975 | Roberts et al. |
| 3,966,634 | A | 6/1976 | Sacks |
| 4,053,432 | A | 10/1977 | Tiepel et al. |
| 4,154,643 | A | 5/1979 | Cook et al. |
| 4,191,733 | A | 3/1980 | Swift et al. |
| 4,218,427 | A | 8/1980 | Yan |
| 4,224,289 | A | 9/1980 | Covey et al. |
| 4,226,830 | A | 10/1980 | Davis |
| 4,259,910 | A | 4/1981 | Warren et al. |
| 4,292,048 | A | 9/1981 | Wesselhoft et al. |
| 4,309,198 | A | 1/1982 | Moss |
| 4,315,758 | A | 2/1982 | Patel et al. |
| 4,331,451 | A | 5/1982 | Isogaya et al. |
| 4,336,125 | A | 6/1982 | Weil et al. |
| 4,378,443 | A | 3/1983 | Minagawa et al. |
| 4,448,589 | A | 5/1984 | Fan et al. |
| 4,467,731 | A | 8/1984 | Di Fonzo |
| 4,483,692 | A | 11/1984 | Patel |
| 4,555,361 | A | 11/1985 | Buckley et al. |
| 4,594,231 | A | 6/1986 | Nishino |
| 4,609,537 | A | 9/1986 | Tolpin et al. |
| 4,628,837 | A | 12/1986 | Mori et al. |
| 4,636,335 | A | 1/1987 | Kawamura et al. |
| 4,654,172 | A | 3/1987 | Matsuda et al. |

(Continued)

FOREIGN PATENT DOCUMENTS

| | | |
|---|---|---|
| CA | 1065193 | 10/1979 |
| DE | 4021309 | 3/1991 |

(Continued)

OTHER PUBLICATIONS

International Search Report and Written Opinion for Patent Application No. PCT/US2016/013034, dated May 26, 2016.

(Continued)

*Primary Examiner* — Edward M Johnson
(74) *Attorney, Agent, or Firm* — King & Spalding (57) ABSTRACT

Treatment of radioactive waste comprising organic compounds, and sulfur-containing compounds and/or halogen-containing compounds. An apparatus comprises a reaction vessel comprising a filter for carrying out thermal treatment of the waste and a thermal oxidizer. Utilizing co-reactants to reduce gas phase sulfur and halogen from treatment of wastes.

36 Claims, 2 Drawing Sheets

(56) References Cited

U.S. PATENT DOCUMENTS

| | | | |
|---|---|---|---|
| 4,655,968 | A | 4/1987 | Queiser et al. |
| 4,656,147 | A | 4/1987 | Iida et al. |
| 4,662,081 | A | 5/1987 | Greenwood et al. |
| 4,664,678 | A | 5/1987 | Rehmat et al. |
| 4,665,632 | A | 5/1987 | Greenwood |
| 4,668,435 | A | 5/1987 | Grantham |
| 4,692,318 | A | 9/1987 | Tolpin et al. |
| 4,699,632 | A | 10/1987 | Babu et al. |
| 4,726,916 | A | 2/1988 | Aubert et al. |
| 4,938,156 | A | 7/1990 | Yahata |
| 4,966,101 | A | 10/1990 | Maeda et al. |
| 4,982,027 | A | 1/1991 | Korff et al. |
| 4,993,323 | A | 2/1991 | Tabery et al. |
| 5,050,511 | A | 9/1991 | Hallett et al. |
| 5,059,404 | A | 10/1991 | Mansour et al. |
| 5,074,890 | A | 12/1991 | Schulz |
| 5,084,258 | A | 1/1992 | Linn |
| 5,160,456 | A | 11/1992 | Lahn et al. |
| 5,224,334 | A | 7/1993 | Bell |
| 5,325,797 | A | 7/1994 | Mei et al. |
| 5,335,609 | A | 8/1994 | Nelson |
| 5,387,738 | A | 2/1995 | Beckham et al. |
| 5,470,544 | A | 11/1995 | Galloway |
| 5,471,937 | A | 12/1995 | Kosky et al. |
| 5,518,702 | A | 5/1996 | Perry |
| 5,536,896 | A | 7/1996 | Hesbol et al. |
| 5,545,798 | A | 8/1996 | Elliot |
| 5,550,311 | A | 8/1996 | Young |
| 5,681,447 | A | 10/1997 | Maycock et al. |
| 5,707,592 | A | 1/1998 | Someus |
| 5,909,654 | A | 6/1999 | Hesbol et al. |
| 6,084,147 | A | 7/2000 | Mason |
| 6,133,498 | A | 10/2000 | Singh et al. |
| 6,211,254 | B1 | 4/2001 | Whitney |
| 6,280,694 | B1 | 8/2001 | Mason |
| 6,281,164 | B1 | 8/2001 | Demmel et al. |
| 7,011,800 | B1 | 3/2006 | Mason |
| 7,531,152 | B2 | 5/2009 | Mason |
| 2003/0198584 | A1 | 10/2003 | Mason |
| 2005/0096495 | A1 | 5/2005 | Mason |
| 2007/0023363 | A1 | 2/2007 | Daines et al. |
| 2008/0039674 | A1 | 2/2008 | Mason |
| 2008/0181835 | A1 | 7/2008 | Mason |

FOREIGN PATENT DOCUMENTS

| | | |
|---|---|---|
| EP | 0471278 | 2/1992 |
| FR | 2106844 | 5/1972 |
| GB | 2039774 | 12/1979 |
| GB | 2048555 | 12/1980 |
| GB | 2271517 | 4/1994 |
| JP | 01171685 | 6/1989 |
| JP | H04295507 | 10/1992 |
| JP | H07128494 A | 5/1995 |
| JP | 2005-003439 | 1/2005 |
| JP | H10110929 A | 12/2013 |
| KR | 2003 0094612 | 12/2003 |
| KR | 10-0498881 | 7/2005 |
| RU | 2216396 | 11/2003 |
| WO | WO 9408661 | 4/1994 |
| WO | WO 00-07193 | 2/2000 |
| ZA | 200203941 | 1/2003 |

OTHER PUBLICATIONS

Scott Jeffers, John F. Mullen, Austin J. Cohen and Ky Dangtran, Control Problem Waste Feeds in Fluid Beds, May 1999, 5 Pages.

Clarence J. Wall, John T. Graves and Elliot J. Roberts, How to Burn Salty Sludges, Apr. 14, 1975, 6 Pages.

Joseph A. Nenni, Richard D. Boardman, Thermal Denitration and Mineralization of Waste Constituents, 14 Pages.

Webpage—Alternative High-Level Waste Treatments at the Idaho National Engineering & Environmental Laboratory; http://books.nap.edu/books/030906628X/html/56.html; 2 pages; dated Sep. 25, 2004.

Cementitious Solidification of DOE's Legacy Reprocessing Waste by Darryl D. Siemer of Idaho National Engineering and Environmental Laboratory.

Patent Abstracts of Japan vol. 013, No. 447 (C-642), Oct. 6, 1989 & JP 01 171685 A (Mitsui Eng & Shipbuild Co. Ltd) Jul. 6, 1989.

Official Action for Japanese Patent Application No. 2017-540083, dated Aug. 2, 2018 (English translation).

Machine translation for DE 4021309 A1 (Mar. 1991).

Supplementary European Search Report for European Patent Application No. 16743831.3 dated Aug. 10, 2018.

METHODS FOR TREATMENT OF RADIOACTIVE ORGANIC WASTE

CROSS REFERENCE TO RELATED APPLICATIONS

This application is a divisional application of U.S. patent application Ser. No. 14/609,738, filed Jan. 30, 2015. The complete disclosure is fully incorporated herein by reference.

FIELD OF THE ART

The embodiments described herein relate to apparatus and methods for treating radioactive waste.

BACKGROUND

There exist many hazardous waste materials that are difficult to dispose because of the possibility that they may contaminate the environment. Such hazardous materials include compounds like radioactive elements, heavy metals, sulfur, and halogens. These materials can be commonly found in many wastes, products, and compounds.

Typically, such hazardous waste is either buried or burned, both of which can be costly processes. Accordingly, it is desirable to process such wastes into materials that are more easily disposed of at lower costs. A large number of methods for treatment of such materials are known.

In the past, waste materials containing sulfur and halogens have typically been treated through processes like cementation, pyrolysis and incineration. Incineration processes Incinerators and related processes that utilize open-flame combustion fall under stringent and comprehensive air pollution laws that typically render the incinerators economically infeasible.

Pyrolysis methods are generally more flexible and can be used for the treatment of most waste materials. However, secondary waste streams that are generated from these processes, such as particulate waste, large volumes of scrubber solutions or dried salts that are difficult to solidify, and off gases, still present process and disposal issues that must be addressed. For example, the presence of sulfur-containing compounds in a vitrification melter can cause a molten sulfur salt pool to accumulate on top of the molten inorganic residue (glass). This pool causes high corrosion rates for the melter equipment. The pool can also have a high electrical conductivity, which causes short-circuiting of the heating electrodes in the melter. Additionally, potentially explosive conditions can result if large quantities of water contact the molten sulfur salt pool.

There remains a need for a process that does not have the limitations and shortcomings of the above described methods for processing radioactive waste materials comprising sulfur-containing compounds and/or halogen-containing compounds.

The description herein of certain advantages and disadvantages of known methods is not intended to limit the scope of the embodiments.

BRIEF SUMMARY

Disclosed herein are apparatus for the treatment of radioactive waste comprising organic compounds, and sulfur-containing compounds and/or halogen-containing compounds, the apparatus comprising: a reaction vessel comprising a filter for carrying out thermal treatment of the waste; and a thermal oxidizer. Optionally, the apparatus may further comprise a process reaction vessel and/or an adsorption vessel comprising adsorbent media for adsorbing sulfur-containing compounds and/or halogen-containing compounds after treatment of the waste by the reaction vessel. Also disclosed herein are methods for treating radioactive waste comprising organic compounds, and sulfur-containing compounds and/or halogen-containing compounds, which utilize the apparatus in continuous, semi-continuous or batch processes.

BRIEF DESCRIPTION OF THE DRAWINGS

Many aspects of the inventive technology can be better understood with reference to the above drawings. The elements and features shown in the drawings are not necessarily to scale, emphasis being placed upon clearly illustrating the principles of exemplary embodiments of the present technology. Moreover, certain dimensions may be exaggerated to help visually convey such principles.

DETAILED DESCRIPTION

The present invention relates generally to apparatus and methods for treating, or decomposing, hazardous and radioactive organic wastes which also comprise sulfur-containing compounds and/or halogen-containing compounds. Generally, the apparatus and methods facilitate the decomposing of the waste so that the volume and mass of the waste to be disposed of is greatly reduced from the initial volume and mass. Additionally, those components of the process waste that are released to the environment, gases and water vapor, are rendered harmless prior to release. The apparatus and methods can be used advantageously to lower process and apparatus complexity, reduce capital cost, lower final waste residue volumes, increase final waste stability, reduce water solubility of the final waste, and/or minimize secondary process wastes, compared to prior art methods. The exemplary apparatus and methods effectively reduce or eliminate the sulfur-containing compounds and halogen-containing compounds in waste feed with greatly reduced or minimal volatization of these compounds. Because the sulfur-containing compounds and halogen-containing compounds are substantially not volatilized, in certain embodiments, no wet scrubber is needed or the production of the wet scrubber solution secondary waste is greatly reduced or completely avoided. An additional advantage of the exemplary apparatus and methods is that the amount of salt waste, for example sulfate or halide salt waste, is minimized or substantially reduced. Further, the exemplary apparatus and methods facilitate the reduction of waste volumes by converting the sulfur-containing compounds and halogen-containing compounds to the lowest mass and highest density final treated waste residue.

General Apparatus and Methods Description

Figure 1:
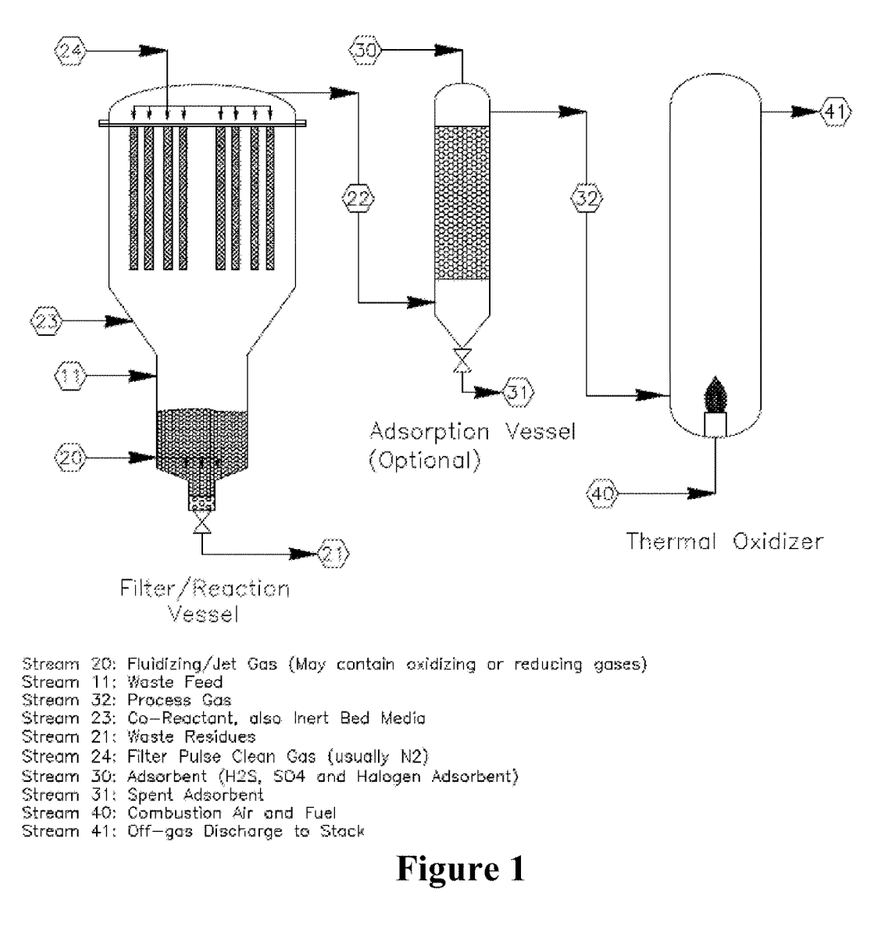
FIG. 1 is a process diagram showing an exemplary embodiment of the present invention.
Figure 2:
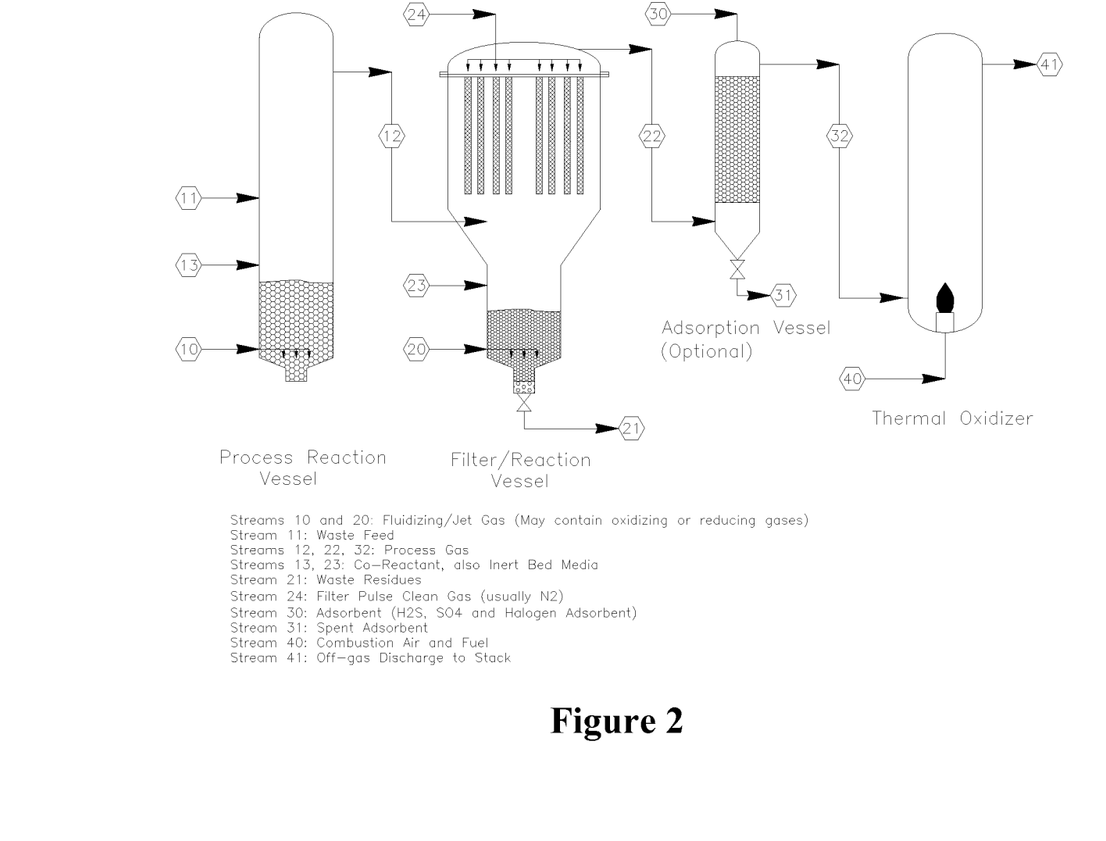
FIG. 2 is a process diagram showing another exemplary embodiment of the present invention.

FIGS. 1 and 2 are process diagrams that show processes and components of alternative exemplary embodiments. In exemplary embodiments, an apparatus comprises a reaction vessel comprising a filter and a thermal oxidizer vessel. In exemplary embodiments, the apparatus further comprises an adsorption vessel or a vessel comprising adsorption media, which is downstream of the reaction vessel and upstream of the thermal oxidizer vessel. In exemplary embodiments, the apparatus further comprises a process reaction vessel upstream of the filter reaction vessel. In certain embodiments, the apparatus comprises a process vessel, a reaction vessel comprising a filter, an adsorption vessel and a thermal oxidizer vessel.

Referring now to FIG. 1, there is shown an exemplary apparatus which includes a reaction vessel comprising a filter with a reaction bed at the bottom of the vessel, an optional adsorption vessel, and a thermal oxidizer (or thermal oxidizing vessel). In the method for treating waste utilizing the exemplary apparatus, waste feed 11 and co-reactants 23 pass into the reaction vessel comprising a filter, simultaneously or sequentially, and form a bed in the lower portion of the reaction vessel comprising a filter. The co-reactant stream 23 may also contain inert bed media, if desired. The reaction vessel comprising a filter includes a filter in the upper portion of the vessel and a reaction bed in the bottom of the vessel. The reaction bed comprises waste, co-reactants, and optionally, inert bed media. In certain embodiments, the lower portion of the reaction vessel comprising a filter is heated to a temperature of, for example, at least about 250° C. Fluidizing or jet gas 20 passes into the bed or lower portion of the reaction vessel comprising a filter to agitate the waste, co-reactants and, if present, inert bed media. Filter pulse clean gas 24 passes in the upper portion of the vessel. As, or after, mineral products are formed in the lower portion of the reactor, solid and liquid waste residues 21 are removed from the lower portion of the reactor. Volatilized waste, or waste gases, are treated at least in part by the filter in the upper part of the reaction vessel comprising a filter. The waste gases and process gas 22/32 are forwarded to a thermal oxidizer, optionally via an adsorption vessel. If included, the adsorption vessel contains adsorption media, or adsorbent, for adsorbing at least a portion of the waste gases, for example volatized sulfur-containing compounds and/or halogen-containing compounds. Adsorbent 30 passes into the adsorption vessel and spent adsorbent 31 including adsorbed waste passes out of the adsorption vessel. Remaining waste gases and process gas 32 pass out of the adsorption vessel and into the thermal oxidizer for further treatment. Combustion air and fuel 40 passes into the thermal oxidizer and after combustion of the waste gases, for example carbon monoxide, hydrogen, and volatile organic compounds, off-gas discharge 41 leaves the thermal oxidizer. The off-gas discharge substantially comprises carbon dioxide and water vapor.

Referring now to FIG. 2, there is shown an alternative exemplary apparatus which includes a process reaction vessel, reaction vessel comprising a filter, an optional adsorption vessel, and a thermal oxidizer (or thermal oxidizing vessel). In the process for treating waste utilizing the exemplary apparatus, waste feed 11 and co-reactants 13 pass into the process reaction vessel, simultaneously or sequentially, and form a bed in the lower portion of the process reaction vessel. The co-reactant stream 13 may also contain inert bed media, if desired. In certain embodiments, the lower portion of the process reaction vessel is heated to a temperature of, for example, at least about 150° C. Optionally, fluidizing or jet gas 10 passes into the bed or lower portion of the process reaction vessel to agitate the waste, co-reactants and, if present, inert bed media. After initial treatment in the process reaction vessel, the waste, co-reactants, and process gas 12 are transferred into the reaction vessel comprising a filter. The reaction vessel comprising a filter includes a filter in the upper portion of the vessel and, optionally, inert bed media in the lower portion of the vessel. Additional co-reactants 23 may be added to the reaction vessel comprising a filter. The co-reactant stream 23 may also contain inert bed media, if desired. The waste, co-reactants and inert bed media, if present, form a bed in the lower portion of the reaction vessel comprising a filter. The lower portion of the reaction vessel comprising a filter is heated to a temperature of at least about 250° C. Fluidizing or jet gas 20 passes into the bed or lower portion of the reaction vessel comprising a filter to agitate the waste, co-reactants and, if present, inert bed media. Filter pulse clean gas 24 passes in the upper portion of the vessel. As, or after, mineral products are formed in the lower portion of the reactor, solid waste residues 21 are removed from the lower portion of the reactor. Volatilized waste residues, or waste gases, are treated at least in part by the filter in the upper part of the reaction vessel comprising a filter. The waste gases and process gas 22/32 are forwarded to a thermal oxidizer, optionally via an adsorption vessel. If included, the adsorption vessel contains adsorbent for adsorbing at least a portion of the waste gases, for example volatized sulfur-containing compounds and/or halogen-containing compounds. Adsorbent 30 passes into the adsorption vessel and spent adsorbent 31 including adsorbed waste passes out of the adsorption vessel. Remaining waste gases and process gas 32 pass out of the adsorption vessel and into the thermal oxidizer for further treatment. Combustion air and fuel 40 passes into the thermal oxidizer and after combustion of the waste gases, for example carbon monoxide, hydrogen, and volatile organic compounds, off-gas discharge 41 leaves the thermal oxidizer. The off-gas discharge substantially comprises carbon dioxide and water vapor.

In exemplary embodiments, an apparatus for the treatment of radioactive waste comprising organic compounds, and sulfur-containing compounds and/or halogen-containing compounds is provided, the apparatus comprising: (a) a reaction vessel comprising a filter for carrying out thermal treatment of the waste; and (b) a thermal oxidizer. In exemplary embodiments, the apparatus further comprises: (c) an adsorption vessel comprising one or more types of adsorbent media for adsorbing sulfur-containing compounds and/or halogen-containing compounds after treatment of the waste by the reaction vessel comprising a filter. In exemplary embodiments, the apparatus further comprises a process reaction vessel upstream of the reaction vessel comprising a filter.

In exemplary embodiments, an apparatus for the treatment of radioactive waste comprising organic compounds, and sulfur-containing compounds and/or halogen-containing compounds is provided, the apparatus comprising: (a) a process reaction vessel comprising co-reactants for treating the waste; (b) a reaction vessel comprising a filter for carrying out thermal treatment of the waste after treatment of the waste in the process reaction vessel; and (c) a thermal oxidizer. In exemplary embodiments, the apparatus further comprises: (d) an adsorption vessel comprising one or more types of adsorbent media for adsorbing sulfur-containing compounds and/or halogen-containing compounds after treatment of the waste by the reaction vessels.

In exemplary embodiments, the reaction vessel comprising a filter comprises a bed in the lower portion of the reaction vessel comprising a filter. In exemplary embodiments, the process reaction vessel comprises a bed in the lower portion of the process reaction vessel. In exemplary embodiments, the bed comprises waste, one or more co-reactants and optionally, inert bed media. In exemplary embodiments, the bed is partially fluidized or jetted.

In exemplary embodiments, the temperature of the reaction vessel comprising a filter is below the temperature at which the sulfur-containing compounds and/or halogen-containing compounds volatilize. In exemplary embodiments, the temperature of the process reaction vessel is below the temperature at which the sulfur-containing compounds and/or halogen-containing compounds volatilize.

Single Reaction Vessel Methods

In an exemplary embodiment, a method for treating radioactive waste comprising organic compounds, and sulfur-containing compounds and/or halogen-containing compounds is provided, the method comprising:

(a) adding radioactive waste comprising organic compounds, and sulfur-containing compounds and/or halogen-containing compounds; and one or more co-reactants to a reaction vessel comprising a filter to form a bed in the lower portion of the reaction vessel comprising a filter;

(b) heating the reaction vessel comprising a filter to a temperature in the range of about 250° C. to about 1050° C. to form pyrolyzed radioactive waste residues and waste gases;

(c) agitating, partially fluidizing or jetting the bed of the reaction vessel comprising a filter;

(d) optionally, adding a reactive gas to the reaction vessel to gasify carbon in the pyrolyzed waste residues;

(e) removing pyrolyzed radioactive waste residues from the reaction vessel comprising a filter for disposal; and (f) transferring the waste gases from the reaction vessel comprising a filter to a thermal oxidizer for combustion;

wherein the reaction vessel comprising a filter may optionally be heated to a temperature in the range of about 250° C. to about 1050° C. prior to step (a).

In an exemplary embodiment, step (b) may be carried out prior to step (a).

In an exemplary embodiment, a method for treating radioactive waste comprising organic compounds, and sulfur-containing compounds and/or halogen-containing compounds is provided, the method comprising:

(a) heating a reaction vessel comprising a filter to a temperature in the range of about 250° C. to about 1050° C.;

(b) adding radioactive waste comprising organic compounds, and sulfur-containing compounds and/or halogen-containing compounds; and one or more co-reactants to the reaction vessel comprising a filter to form a bed in the lower portion of the reaction vessel comprising a filter;

(c) agitating, partially fluidizing or jetting the bed while maintaining the temperature of the reaction vessel comprising a filter in the range of about 250° C. to about 1050° C. to form pyrolyzed radioactive waste residues and waste gases;

(d) removing pyrolyzed radioactive waste residues from the reaction vessel comprising a filter for disposal; and (e) transferring the waste gases from the reaction vessel comprising a filter to a thermal oxidizer for combustion.

In exemplary embodiments, the method further comprises adding a reactive gas to the reaction vessel comprising a filter in step (c) to gasify carbon in the pyrolyzed waste residues. In exemplary embodiments, the reactive gas may be an oxidizing or reducing gas. In exemplary embodiments, the introduction of the reactive gas can be used to reduce carbon content in the pyrolyzed waste residues. In exemplary embodiments, the step of adding a reactive gas to gasify carbon in the pyrolyzed waste residues is carried out at a temperature below that which the sulfur-containing compounds and/or halogen-containing compounds volatilize.

In an exemplary embodiment, a method for treating radioactive waste comprising organic compounds, and sulfur-containing compounds and/or halogen-containing compounds is provided, the method comprising:

(a) adding radioactive waste comprising organic compounds, and sulfur-containing compounds and/or halogen-containing compounds; and one or more co-reactants to a reaction vessel comprising a filter to form a bed in the lower portion of the reaction vessel comprising a filter;

(b) heating the reaction vessel comprising a filter to a temperature in the range of about 250° C. to about 1050° C. to form pyrolyzed radioactive waste residues and waste gases;

(c) agitating, partially fluidizing or jetting the bed of the reaction vessel comprising a filter;

(d) adding a reactive gas to the reaction vessel to gasify carbon in the pyrolyzed waste residues;

(e) removing pyrolyzed radioactive waste residues from the reaction vessel comprising a filter for disposal; and (f) transferring the waste gases from the reaction vessel comprising a filter to a thermal oxidizer for combustion.

In an exemplary embodiment, step (b) may be carried out prior to step (a).

In exemplary embodiments, the method further comprises transferring the waste gases to an adsorption vessel comprising adsorbent for adsorbing sulfur-containing compounds and/or halogen-containing compounds prior to transferring the waste gases to a thermal oxidizer for combustion.

In exemplary embodiments, the bed in the reaction vessel is agitated, for example by a mechanical agitation method. In exemplary embodiments, the bed in the reaction vessel is partially fluidized such as by jetting. In exemplary embodiments, the bed in the reaction vessel is not fluidized.

In exemplary embodiments, the radioactive waste comprising organic compounds, and sulfur-containing compounds and/or halogen-containing compounds; and the one or more co-reactants are premixed prior to addition to the reaction vessel. In exemplary embodiments, the radioactive waste comprising organic compounds, and sulfur-containing compounds and/or halogen-containing compounds is added to the reaction vessel with the one or more co-reactants. In exemplary embodiments, the radioactive waste comprising organic compounds, and sulfur-containing compounds and/or halogen-containing compounds is added to the reaction vessel before the one or more co-reactants. In exemplary embodiments, the radioactive waste comprising organic compounds, and sulfur-containing compounds and/or halogen-containing compounds is added to the reaction vessel after the one or more co-reactants.

In exemplary embodiments of any of the methods described herein, the method comprises adding a reactive gas to the reaction vessel comprising a filter to gasify carbon in the pyrolyzed waste residues. In exemplary embodiments, the reactive gas may be an oxidizing or reducing gas. In exemplary embodiments, the introduction of the reactive gas can be used to reduce carbon content in the pyrolyzed waste residues, for example partially pyrolyzed waste residues. In exemplary embodiments, the step of adding a reactive gas to gasify carbon in the pyrolyzed waste residues is carried out at a temperature below that which the sulfur-containing compounds and/or halogen-containing compounds volatilize.

In exemplary embodiments, the reactive gas is an oxidizing gas, for example nitrogen with a trace of oxygen, steam with a trace of oxygen, or another slightly oxidizing gas or gas mixture. In exemplary embodiments, the reactive gas comprises less than about 10%, about 9%, about 8%, about 7%, about 6%, or about 5% oxygen. In exemplary embodiments, the reactive gas comprises about 1% to about 10%, about 1% to about 8%, or about 2% to about 5% oxygen. In exemplary embodiments, the amount of oxygen in the reactive gas is any suitable amount such that the reaction of the oxygen with the waste residues, for example carbon-containing waste residues, does not produce an undesirable or detrimental amount of heat. An excessive amount of oxygen in the reactive gas may produce fires, deflagration mixtures and hot spots, which could melt or agglomerate the bed. In exemplary embodiments, the reactive gas may fluidize or partially fluidize the bed in the reaction vessel.

In exemplary embodiments, the bed comprises radioactive waste comprising organic compounds, and sulfur-containing compounds and/or halogen-containing compounds; one or more co-reactants, pyrolyzed radioactive waste residues or a mixture thereof. In exemplary embodiments, the bed further comprises inert media. In exemplary embodiments, the bed does not contain inert media.

In exemplary embodiments, the method further comprises injecting a pulse clean gas to clean the filter. In exemplary embodiments, the pulse clean gas is an inert gas, for example nitrogen gas. In exemplary embodiments, the pulse gas is used to clean filter cake off the filter.

In exemplary embodiments, the method is a continuous process. In exemplary embodiments, the method is a batch or semi-continuous process.

Two Reaction Vessel Methods

In an exemplary embodiment, a method for treating radioactive waste comprising organic compounds, and sulfur-containing compounds and/or halogen-containing compounds is provided, the method comprising:

(a) adding radioactive waste comprising organic compounds, and sulfur-containing compounds and/or halogen-containing compounds; and one or more co-reactants to a process reaction vessel to form a bed in the lower portion of the process reaction vessel;

(b) heating the process reaction vessel to a temperature in the range of about 35° C. to about 1050° C.;

(c) agitating, partially fluidizing or jetting the bed while maintaining the temperature of the process reaction vessel in the range of about 35° C. to about 1050° C. to form fully or partially pyrolyzed radioactive waste residues and waste gases;

(d) transferring the fully or partially pyrolyzed radioactive waste residues and waste gases from the process reaction vessel to a reaction vessel comprising a filter to form a bed in the lower portion of the reaction vessel comprising a filter;

(e) heating the reaction vessel comprising a filter to a temperature in the range of about 250° C. to about 1050° C.;

(f) agitating, partially fluidizing or jetting the bed of the reaction vessel comprising a filter while maintaining the temperature of the reaction vessel comprising a filter in the range of about 250° C. to about 1050° C. to form fully or partially pyrolyzed radioactive waste residues and waste gases;

(g) optionally, adding a reactive gas to the reaction vessel comprising a filter to gasify carbon in the partially pyrolyzed waste residues;

(h) removing the fully pyrolyzed radioactive waste residues from the reaction vessel comprising a filter for disposal; and (i) transferring the waste gases from the reaction vessel comprising a filter to a thermal oxidizer for combustion;

wherein the process reaction vessel may optionally be to heated to a temperature in the range of about 35° C. to about 1050° C. prior to step (a); and wherein the reaction vessel comprising a filter may optionally be to heated to a temperature in the range of about 250° C. to about 1050° C. prior to step (d).

In an exemplary embodiment, step (b) may be carried out prior to step (a).

In an exemplary embodiment, step (e) may be carried out prior to step (d).

In an exemplary embodiment, a method for treating radioactive waste comprising organic compounds, and sulfur-containing compounds and/or halogen-containing compounds is provided, the method comprising:

(a) heating a process reaction vessel to a temperature in the range of about 35° C. to about 1050° C.;

(b) adding radioactive waste comprising organic compounds, and sulfur-containing compounds and/or halogen-containing compounds; and one or more co-reactants to a process reaction vessel to form a bed in the lower portion of the process reaction vessel;

(c) agitating, partially fluidizing or jetting the bed while maintaining the temperature of the process reaction vessel in the range of about 35° C. to about 1050° C. to form fully or partially pyrolyzed radioactive waste residues and waste gases;

(d) transferring the fully or partially pyrolyzed radioactive waste residues and waste gases from the process reaction vessel to a reaction vessel comprising a filter at a temperature in the range of about 250° C. to about 1050° C. to form a bed in the lower portion of the reaction vessel comprising a filter;

(e) agitating, partially fluidizing or jetting the bed while maintaining the temperature of the reaction vessel comprising a filter in the range of about 250° C. to about 1050° C. to form fully pyrolyzed radioactive waste residues and waste gases;

(f) removing pyrolyzed radioactive waste residues from the reaction vessel comprising a filter for disposal; and (g) transferring the waste gases from the reaction vessel comprising a filter to a thermal oxidizer for combustion.

In an exemplary embodiment, a method for treating radioactive waste comprising organic compounds, and sulfur-containing compounds and/or halogen-containing compounds is provided, the method comprising:

(a) adding radioactive waste comprising organic compounds, and sulfur-containing compounds and/or halogen-containing compounds; and one or more co-reactants to a process reaction vessel to form a bed in the lower portion of the process reaction vessel;

(b) heating the process reaction vessel to a temperature in the range of about 35° C. to about 1050° C.;

(c) agitating, partially fluidizing or jetting the bed while maintaining the temperature of the process reaction vessel in the range of about 35° C. to about 1050° C. to form fully or partially pyrolyzed radioactive waste residues and waste gases;

(d) transferring the fully or partially pyrolyzed radioactive waste residues and waste gases from the process reaction vessel to a reaction vessel comprising a filter to form a bed in the lower portion of the reaction vessel comprising a filter;

(e) heating the reaction vessel comprising a filter to a temperature in the range of about 250° C. to about 1050° C.;

(f) agitating, partially fluidizing or jetting the bed of the reaction vessel comprising a filter while maintaining the temperature of the reaction vessel comprising a filter in the range of about 250° C. to about 1050° C. to form fully or partially pyrolyzed radioactive waste residues and waste gases;

(g) optionally, adding a reactive gas to the reaction vessel comprising a filter to gasify carbon in the partially pyrolyzed waste residues;

(h) removing the fully pyrolyzed radioactive waste residues from the reaction vessel comprising a filter for disposal; and (i) transferring the waste gases from the reaction vessel comprising a filter to a thermal oxidizer for combustion.

In an exemplary embodiment, step (b) may be carried out prior to step (a). In an exemplary embodiment, step (e) may be carried out prior to step (d).

In exemplary embodiments, the method further comprises transferring the waste gases to an adsorption vessel comprising adsorbent for adsorbing sulfur-containing compounds and/or halogen-containing compounds prior to transferring the waste gases to a thermal oxidizer for combustion.

In exemplary embodiments, the bed in the process reaction vessel is agitated, for example by a mechanical agitation method. In exemplary embodiments, the bed in the process reaction vessel is partially fluidized. In exemplary embodiments, the bed in the process reaction vessel is jetted. In exemplary embodiments, the bed in the process reaction vessel is not fluidized.

In exemplary embodiments, the bed in the reaction vessel comprising a filter is agitated, for example by a mechanical agitation method. In exemplary embodiments, the bed in the reaction vessel comprising a filter is partially fluidized. In exemplary embodiments, the bed in the reaction vessel comprising a filter is jetted. In exemplary embodiments, the bed in the reaction vessel comprising a filter is not fluidized.

In exemplary embodiments, the radioactive waste comprising organic compounds, and sulfur-containing compounds and/or halogen-containing compounds; and the one or more co-reactants are premixed prior to addition to the process reaction vessel. In exemplary embodiments, the radioactive waste comprising organic compounds, and sulfur-containing compounds and/or halogen-containing compounds is added to the process reaction vessel with the one or more co-reactants. In exemplary embodiments, the radioactive waste comprising organic compounds, and sulfur-containing compounds and/or halogen-containing compounds is added to the process reaction vessel before the one or more co-reactants. In exemplary embodiments, the radioactive waste comprising organic compounds, and sulfur-containing compounds and/or halogen-containing compounds is added to the process reaction vessel after the one or more co-reactants.

As referred to herein, fully pyrolyzed radioactive waste residues do not substantially contain carbon, i.e., less than 1% by weight. As referred to herein, partially pyrolyzed radioactive waste residues contain carbon or organic compounds. In exemplary embodiments of any of the foregoing methods, partially pyrolyzed radioactive waste residues may be gasified to convert the carbon in the residues to carbon dioxide, carbon monoxide or volatile organic compounds. In exemplary embodiments, partially pyrolyzed radioactive waste residues may be gasified, for example by adding a reactive gas to the reaction vessel comprising the partially pyrolyzed radioactive waste residues and allowing the reactive gas to react with the partially pyrolyzed radioactive waste residues to form fully pyrolyzed radioactive waste residues.

In exemplary embodiments, the fully or partially pyrolyzed radioactive waste residues and waste gases are transferred to the reaction vessel comprising a filter without the adding one or more co-reactants. In exemplary embodiments, the fully or partially pyrolyzed radioactive waste residues and waste gases and one or more co-reactants are premixed prior to addition to the reaction vessel comprising a filter. In exemplary embodiments, the fully or partially pyrolyzed radioactive waste residues and waste gases are added to the reaction vessel comprising a filter with one or more co-reactants. In exemplary embodiments, the fully or partially pyrolyzed radioactive waste residues and waste gases are added to the reaction vessel comprising a filter before one or more co-reactants. In exemplary embodiments, the fully or partially pyrolyzed radioactive waste residues and waste gases are added to the reaction vessel comprising a filter after one or more co-reactants.

In exemplary embodiments, the reactive gas is an oxidizing gas, including for example nitrogen with a trace of oxygen, steam, and steam with a trace of oxygen. Alternatively, the reactive gases may contain reducing gases, including for example nitrogen with hydrogen; nitrogen with ammonia; steam with hydrogen; and steam with hydrogen, ammonia, and/or volatile organic compound vapors. In exemplary embodiments, the reactive gas, or a mixture of reactive gases, may fluidize or partially fluidize the bed in the reaction vessel. In exemplary embodiments, the reactive gas, or a mixture of reactive gases, can be added to the process reaction vessel and/or the reaction vessel comprising a filter. The reactive gas, or a mixture of reactive gases, added to the process reaction vessel may be the same or different from the reactive gas, or mixture of reactive gases, that may be added to the reaction vessel comprising the filter.

In exemplary embodiments, the bed in the process reaction vessel comprises radioactive waste comprising organic compounds, and sulfur-containing compounds and/or halogen-containing compounds; one or more co-reactants, pyrolyzed radioactive waste residues or a mixture thereof. In exemplary embodiments, the bed in the process reaction vessel further comprises inert media. In exemplary embodiments, the bed in the process reaction vessel does not contain inert media.

In exemplary embodiments, the method further comprises injecting a pulse clean gas to clean the filter in the reaction vessel comprising a filter. In exemplary embodiments, the pulse clean gas is an inert gas, for example nitrogen gas. In exemplary embodiments, the pulse gas is used to clean filter cake off the filter in the reaction vessel comprising a filter.

In exemplary embodiments, the temperature of the process reactor is at a different temperature from that of the reaction vessel comprising a filter. In exemplary embodiments, the temperature of the process reactor is higher than that of the reaction vessel comprising a filter. In exemplary embodiments, the temperature of the process reactor is lower than that of the reaction vessel comprising a filter.

In exemplary embodiments, the steam reformation does not occur in the reaction vessel comprising the filter. In certain embodiments, pyrolysis in reaction vessel comprising a filter occurs under oxidizing conditions or in the presence of a small amount of oxygen. In other embodiments the reaction vessel comprising a filter occurs under reducing conditions or in the presence of an amount of reducing gases such as, hydrogen, ammonia and/or volatile organic vapors.

In exemplary embodiments, the method is a continuous process. In exemplary embodiments, the method is a batch or semi-continuous process.

Waste

Any waste or product stream containing organic compounds, and sulfur-containing compounds and/or halogen-containing compounds can be treated by the exemplary apparatus and methods. In exemplary embodiments, the waste to be treated by the exemplary apparatus and methods is radioactive waste, for example radioactive waste comprising organic compounds, and sulfur-containing compounds and/or halogen-containing compounds. Radioactive wastes are wastes that comprise radioactive material or radionuclides. Common sources of radioactive wastes include by-products of nuclear power generation and other applications of nuclear fission or nuclear technology, such as research and medicine. Radioactive waste is hazardous to most forms of life and the environment, and is regulated by government agencies in order to protect human health and the environment.

In exemplary embodiments, the waste to be treated by the exemplary apparatus and methods is generally from nuclear facilities. In exemplary embodiments, the waste further comprises alkali metals and/or heavy metals. In exemplary embodiments, the waste comprises ion exchange resin, for example contaminated ion exchange resin. In exemplary embodiments, the waste feed may be dry or wet. The waste feed may comprise liquids, liquid slurries, sludges, solids and gases. The waste feed can have any pH value and need not be pre-processed before being introduced into the exemplary methods for treatment. In exemplary embodiments, the waste comprises about 5% to about 100% carbonaceous or organic content by weight. In certain embodiments, the waste does not contain more than 10% nitrate-containing compounds by weight.

Co-Reactants

In exemplary embodiments, one or more co-reactants are added to reaction vessel comprising a filter, simultaneously or sequentially, with the waste feed. In exemplary embodiments, one or more co-reactants are added to reaction vessel comprising a filter with the waste feed. In exemplary embodiments, one or more co-reactants are added to reaction vessel comprising a filter before the waste feed. In certain embodiments, co-reactants are added to the process reaction vessel. In certain embodiments, co-reactants are not added to the process reaction vessel.

In exemplary embodiments, one or more co-reactants may be added to achieve mineralization of one or more compounds in the waste. In exemplary embodiments, one or more co-reactants may be added to react with sulfur-containing compounds and/or halogen-containing compounds in the waste to form non-volatile and/or water insoluble compounds. In exemplary embodiments, one or more co-reactants may be added to react with alkali metals in the waste to form high melting and/or water insoluble compounds. In exemplary embodiments, one or more co-reactants may be added to react with metals in the waste to form spinels or other water insoluble compounds.

Co-reactant compounds will be known to those of ordinary skill in the art and any suitable co-reactant compound may be used in the exemplary apparatus and methods as necessary or desired. Exemplary co-reactants such as lime, clay, kaolin clay, magnesium compounds, calcium compounds, aluminum compounds, phosphate compounds, iron compounds, zinc compounds, nickel compounds, tin compounds, cerium compounds, and silica compounds may be used. In certain embodiments, co-reactants may be mixed with the waste feed before it is introduced into the reaction vessel comprising a filter. This mixing step allows the co-reactants to, for example, bind the sulfur-containing compounds, halogen-containing compounds, alkali metals, certain radioactive elements, and heavy metals into a stable mineral form. Alternatively, co-reactants may be added separately into reaction vessel comprising a filter without first mixing co-reactants with the waste feed. In exemplary embodiments, the one or more co-reactants for treatment of waste comprising sulfur-containing compounds under reducing conditions in the process reaction vessel or the reaction vessel comprising a filter are selected from the group consisting of: compounds of calcium, zinc, iron, nickel, tin, alkali metals, such as sodium, potassium and lithium; alkaline earth metals, such as magnesium and barium; aluminum; bismuth; manganese; molybdenum; phosphorus; silicon; silver; strontium; tin; calcium silicates; commercial $H_2S$ adsorbents; or other compounds which can be reacted with sulfur-containing compounds to form stable sulfides and/or $H_2S$; and mixtures thereof.

In exemplary embodiments, the one or more co-reactants for treatment of waste comprising sulfur-containing compounds under oxidizing conditions in the process reaction vessel or the reaction vessel comprising a filter are selected from the group consisting of: compounds of calcium, magnesium, barium, sodium, potassium, lithium, aluminum, iron, nickel, manganese, clays, calcium silicates, or other compounds which can be reacted with sulfur-containing compounds to form stable sulfate and sulfite compounds with sulfur oxides ($SO_4^{2-}$ and $SO_3^{2-}$), and mixtures thereof. In exemplary embodiments, the waste and one or more co-reactants are heated to temperature sufficient to accomplish the conversion of the sulfur-containing compounds into the sulfate or sulfite compounds but less than the temperature at which the sulfates and sulfites decompose or melt. In certain embodiments, the waste and one or more co-reactants are heated to a temperature of about 884° C. or less, for example, to prevent decomposition or melting of sodium sulfate.

In exemplary embodiments, the one or more co-reactants are added to convert the sulfur-containing compounds into sulfide compounds, for example iron sulfide (e.g. FeS or $FeS_2$), calcium sulfide, zinc sulfide and/or other high density sulfides. In exemplary embodiments, the waste and one or more co-reactants are heated to temperature sufficient to accomplish the conversion of the sulfur-containing compounds into the sulfide compounds but less than the temperature at which the sulfides are gasified, e.g. through oxidation or thermal decomposition. In certain embodiments, the waste and one or more co-reactants are heated to a temperature of about 602° C. or less, for example, to prevent decomposition of $Fe_2S$. In certain embodiments, the waste and one or more co-reactants are heated to a temperature of about 1050° C. or less, for example, to prevent decomposition of calcium sulfide or zinc sulfide.

In exemplary embodiments, the one or more co-reactants for treatment of waste comprising halogen-containing compounds in the process reaction vessel or the reaction vessel comprising a filter are selected from the group consisting of: compounds of calcium, zinc, iron, nickel, sodium, potassium, lithium, aluminum, magnesium, barium, bismuth, cerium, cobalt, manganese, molybdenum, silver, tin, titanium, zirconium, clays, calcium silicates, or other compounds which can be reacted with halogen-containing compounds to form salts or stable, non-volatile halide compounds, and mixtures thereof. In exemplary embodiments, the waste and one or more co-reactants are heated to temperature sufficient to accomplish the conversion of the halogen-containing compounds into the salts or halide compounds but less than the temperature at which the salts or halides decompose or melt. In certain embodiments, the waste and one or more co-reactants are heated to a temperature of about 801° C. or less, for example, to prevent decomposition or melting of sodium chloride.

Preferably less than 20% by weight of unbound co-reactants are present in the reaction vessel comprising a filter at any given time during the process to not unnecessarily add to the weight and volume of the pyrolyzed solids residues. Accordingly, the amount of co-reactants within the bed of the reaction vessel comprising a filter can be controlled so the reactions occur with the least amount of co-reactant. However, the presence of small amounts of co-reactants can help prevent agglomeration to the point of adversely impacting the treatment of the waste in the reaction vessel comprising a filter.

A problem faced in disposing of some waste from nuclear facilities is that products formed by typical treatment processes are water-soluble. In the case that these water-soluble products also contain radioactive isotopes, additional stabilization of the products such as grouting, solidification, or vitrification, prior to disposal will be required to prevent water dissolution of the buried product into the ground water. Accordingly, the formation of water-insoluble minerals is both advantageous and desirable, because they are more easily disposed of and processed. It is also desirable to select and produce a product that is non-hygroscopic. The term non-hygroscopic refers to compounds that do not form hydrates. Solids that form hydrates, such as sodium carbonate, can swell over time and can rupture or damage the containers they are stored in.

Co-reactants can bind heavy metals, sulfur-containing compounds and halogen-containing compounds to form solid metal sulfides, spinels or calcium product matrix, or other non-volatile stable products. The resultant off-gas typically contains <5% of incoming S, Cl, and F. This high retention of normal acid gases in the solid product allows scrubber solutions to be recycled to the reaction vessel thereby eliminating secondary scrubber solution waste. A specific co-reactant that can be used is lime. The sulfur-containing compounds and halogen-containing compounds can be directly bonded by the addition of lime (CaO) to form $CaSO_4$ (gypsum) or $CaCl_2$) in the scrubber or the S as $SO_4$ can be bound into the crystalline structure of certain mineral forms such as Nepheline or the Cl can be bound into the crystalline structure of certain mineral forms thereby converting it to water insoluble Sodalite.

Another advantage to the addition of co-reactants is the formation of higher melting point compounds that will result in less agglomeration in the reaction vessel comprising a filter. Although the formation of higher melting point compounds helps to prevent agglomeration in the reaction vessel, some agglomeration is preferred in the present invention to increase the size of the mineral products. However, it is not desirable to have agglomeration to the point of ceasing the fluidization of the reactor. Therefore, another feature of the present invention is to add only the appropriate amounts of co-reactant to effectively mineralize the sulfur-containing compounds, halogen-containing compounds, alkali metals, phosphates, and/or boron compounds, and to also prevent agglomeration to the point of adversely impacting the treatment of the waste in the reaction vessel comprising a filter.

In exemplary embodiments, the percentage of the one or more co-reactants added to bind the sulfur-containing compounds, halogen-containing compounds, alkali metals, phosphates, and/or boron compounds is greater than 50% stoichiometric ratio, with a preferred range of 100% to 125% stoichiometric ratio, to produce the desired mineral product. For example, to produce Nepheline, the preferred amounts of co-reactant to waste compound are as follows: 1 to 1.25 moles Kaolin clay ($Al_2O_3$-2-$SiO_2$) with 2 moles of Na. In exemplary embodiments, the sulfur-containing compounds in the treated or pyrolyzed waste solids are substantially in the form of $FeS_2$, FeS, ZnS, CaS or mixtures thereof. In a preferred embodiment, the sulfur-containing compounds in the treated or pyrolyzed waste solids are substantially in the form of $FeS_2$. $FeS_2$ produces the lowest volume of sulfur-containing compounds. In exemplary embodiments, when the sulfur-containing compounds in the treated or pyrolyzed waste solids are substantially in the form of $FeS_2$ the waste need not undergo further treatment with, for example, a scrubber, such as a wet scrubber. However, if the waste type and operating conditions are such that $FeS_2$ is not readily formed or the desired operating temperature of the reaction vessel is above the decomposition temperature of $FeS_2$, FeS may be formed or alternative co-reactants can be added to produce other dense, high temperature resistant sulfides, water insoluble sulfides such as: CaS, $ZnS_2$, SnS and/or $SnS_2$. In exemplary embodiments, the sulfur-containing compounds in the treated or pyrolyzed waste solids undergo further treatment with a wet scrubber. In exemplary embodiments, the sulfur-containing compounds in the treated or pyrolyzed waste solids do not undergo further treatment with a wet scrubber.

In exemplary embodiments, the one or more co-reactants comprise calcium compounds, calcium silicate, and/or clay to produce a calcium silicate rich composition. The calcium silicon rich composition may be used as a high strength cement with the addition of water.

In exemplary embodiments, co-reactants are added to the process reaction vessel or the reaction vessel comprising a filter to produce mineral compounds that are substantially water insoluble. In certain embodiments, the one or more co-reactants used do not change the valence state of the metal ions in the waste.

Reaction Vessel Comprising a Filter

In exemplary embodiments, the reaction vessel comprising a filter comprises a closed vessel or reactor with inlets for the waste feed 11, fluidizing or jet gas 20, co-reactants and/or inert bed media 23, and filter pulse clean gas 24, e.g. nitrogen; outlets for the process gas 22/32 and waste residue 21; a filter in the upper portion of the vessel; and a lower portion of the vessel suitable for containing a partially fluidized or jetted bed comprising co-reactants and waste. In exemplary embodiments, the reaction vessel comprising a filter may be any suitable size for carrying out treatment of waste. In exemplary embodiments, the reaction vessel comprising a filter is where the waste is subjected to pyrolysis and optional reactive gases. In exemplary embodiments, the filter is included to remove solids from the process gas 22/32 before passage into the thermal oxidizer and optionally, the adsorption vessel. In exemplary embodiments, the filter is made of sintered metal or ceramic elements. In certain embodiments, a reactive gas can be added to the reaction vessel comprising a filter to gasify carbon in the radioactive waste. In certain embodiments, the reaction vessel comprising a filter is the only vessel used for pyrolysis in the apparatus for the treatment of radioactive waste comprising organic compounds, and sulfur-containing compounds and/or halogen-containing compounds. In certain embodiments, the reaction vessel comprising a filter is the second of two vessels used for pyrolysis in the apparatus for the treatment of radioactive waste comprising organic compounds, and sulfur-containing compounds and/or halogen-containing compounds.

In exemplary embodiments, the minimum operating temperature for the reaction vessel comprising a filter is about 150° C., or about 250° C. In exemplary embodiments, the minimum operating temperature for the reaction vessel comprising a filter is the temperature at which the evaporation or pyrolysis of the organic compounds in the waste occurs, for example about 35° C. when the waste comprises low-boiling organic solvents or greater than 350° C. for wastes with wood, cellulose, PVC plastic, resins, and other long-chain organic polymers.

In exemplary embodiments, the maximum operating temperature for the reaction vessel comprising a filter is about 1050° C., about 884° C., about 801° C., about 602° C., about 600° C., about 420° C., or about the temperature at which the sulfides, sulfates, sulfites and/or halide compounds formed from reaction with the one or more co-reactants and the waste begin to decompose or melt.

In exemplary embodiments, the temperature of the reaction vessel comprising a filter is in the range of about 150° C. to about 1050° C., about 150° C. to about 800° C., or about 200° C. to about 550° C.

In exemplary embodiments, the reaction vessel comprising a filter is used to treat radioactive waste comprising ion exchange resin. In exemplary embodiments, when the reaction vessel comprising a filter is used to treat ion exchange resin, the operating temperature for the reaction vessel comprising a filter is in the range of about 250° C. to about 800° C., or about 250° C. to about 600° C.

In exemplary embodiments, the reaction vessel comprising a filter can operate at a slight negative pressure or at positive pressures, for example a pressure of about 7 to about 115, about 10 to about 25, or about 12 to about 20 psia.

In exemplary embodiments, the fluidizing or jet gas for the partially fluidized or jetted bed of the reaction vessel comprising a filter comprising co-reactants and waste is, for example, steam, hydrogen, oxygen, methane, ammonia, carbon dioxide, carbon monoxide, inert gases, oxidizing gases, reducing gases, volatile organic vapors and mixtures thereof. In certain embodiments, steam is introduced into the reaction vessel comprising a filter. In certain embodiments, steam is not introduced into the reaction vessel comprising a filter. In certain embodiments, the fluidizing or jet gas is not a reducing gas. In exemplary embodiments, the fluidizing or jet gas is jetted into the bottom of the reaction vessel comprising a filter sufficient to agitate and mix the solids in the bed. In exemplary embodiments, the fluidizing or jet gas is, for example, a mixture of nitrogen with as about 3 to about 8% oxygen. In exemplary embodiments, the fluidizing or jet gas is any gas that can oxidize the carbon in the waste or waste residues while maintaining the bed of solids at less than 550° C. to ensure that any $FeS_2$ is not decomposed.

In certain embodiments, the bed in the lower portion of the reaction vessel comprising a filter is partially fluidized. In exemplary embodiments, a partially fluidized bed is a bed of solids that is agitated by mechanical means or by the localized introduction of the jet gas where the jet gas flow is not sufficient, or the flow is not sufficiently uniform, to fully fluidize all the solids in the bed, e.g., maintain the solids above their minimum fluidization velocity. For the partially fluidized or jetted bed, the momentum of the gas jet will induce mixing in the bed of solids without fluidizing the bulk of the solids. In certain embodiments, the bed in the lower portion of the reaction vessel comprising a filter is jetted. In certain embodiments, the bed in the lower portion of the reaction vessel comprising a filter is not fluidized. In certain embodiments, fluidizing or jet gas is not added to the bed in the lower portion of the reaction vessel comprising a filter. In certain embodiments, the bed in the lower portion of the reaction vessel comprising a filter is agitated mechanically.

In certain embodiments, the bed in the lower portion of the reaction vessel comprising a filter is agitated mechanically and is not fluidized or jetted.

In exemplary embodiments, when the reaction vessel comprising a filter is used for treatment of radioactive waste after treatment by a process reaction vessel, the reaction vessel comprising a filter is not uniformly fluidized. One of the primary reasons the bed in the reaction vessel comprising a filter is not fluidized is the solids from the process reaction vessel are generally very fine and cannot be uniformly fluidized due to the small particle size.

In exemplary embodiments, the partially fluidized or jetted bed comprising co-reactants and waste further comprises inert bed media, for example inert ceramic media such as silica, mullite, corundum, corderite, or alumina; and other types of inert media, such as bauxite, quartz or silica sand. In certain embodiments, the inert bed media comprises bauxite. In certain embodiments, the inert bed media comprises alumina beads. The size of the alumina beads is in the range of about 100 to about 5000 microns, or about 200 to about 1000 microns, in diameter. Such size beads do not easily elutriate out of the vessel and therefore minimize carryover. In certain embodiments, the inert bed media does not comprise alumina. In certain embodiments, the partially fluidized or jetted bed comprising co-reactants and waste does not comprise inert bed media.

In certain embodiments, the partially fluidized or jetted bed of the reaction vessel comprising a filter comprises an oxidizing zone or portion. In certain embodiments, the partially fluidized or jetted bed of the reaction vessel comprising a filter does not contain a reducing, or oxygen-starved, zone or portion. In exemplary embodiments, the reaction vessel comprising a filter can be operated under oxidizing conditions. In exemplary embodiments, the reaction vessel comprising a filter can be operated under reducing conditions. In exemplary embodiments, the reaction vessel comprising a filter are not operated under reducing conditions.

In exemplary embodiments, the filter in the reaction vessel comprising a filter comprises or consists essentially of a set of sintered metal or ceramic media arranged as filter candles or elements, and the filter candles or elements can be, for example, sealed into a tubesheet near the top of the vessel. The filter elements are pulse cleaned using an inert gas to remove accumulated filter cake that will collect on the outside surface of the filter elements. The size of the filter varies as needed to accommodate the solids loading and gas flows in the vessel.

Thermal Oxidizer

A thermal oxidizer is a process unit for air pollution control in many chemical plants that decomposes hazardous gases at a high temperature and releases them into the atmosphere. In exemplary embodiments, the thermal oxidizer heats the waste gases up to combustion temperature and mixes the waste gases with air or oxygen to facilitate complete oxidation of the hydrogen, ammonia, carbon monoxide and volatile organic vapors from the reaction vessel comprising a filter to carbon dioxide and water vapor. In exemplary embodiments, the operating temperature of the thermal oxidizer is about 800° C. to about 1200° C., or about 850° C. to about 950° C.

Adsorption Vessel

In exemplary embodiments, the apparatus and methods optionally further comprise an adsorption vessel.

In exemplary embodiments, the apparatus and methods optionally comprise an adsorption vessel, which is downstream of the reaction vessel comprising a filter, and if present, the process reaction vessel. The adsorption vessel comprises one or more types of adsorbent media. In certain embodiments, the adsorption vessel comprises one or more types of adsorbent media, which can be used to adsorb sulfur-containing compounds and/or halogen-containing compounds.

In exemplary embodiments, when the process reaction vessel and/or the reaction vessel comprising a filter are operated at oxidizing conditions or in the presence of a small amount of oxygen, the methods further comprise transferring the waste gases to an adsorption vessel comprises one or more types of adsorbent media. In exemplary embodiments, the adsorbent media comprises one or more types of adsorbent media that adsorb sulfur-containing compounds and produces a sulfate compound, for example calcium sulfate.

In exemplary embodiments, when the process reaction vessel and/or the reaction vessel comprising a filter are operated at reducing conditions or in the presence of reducing gases, the methods further comprise transferring the waste gases to an adsorption vessel comprising one or more types of adsorbent media. In the exemplary embodiments, the one or more types of adsorbent media comprise metal or alkaline earth adsorbents. In exemplary embodiments, the one or more types of adsorbent media comprise metals, for example iron, nickel or zinc. In exemplary embodiments, the one or more types of adsorbent media comprise metal oxides, for example $Fe_2O_3$, $FeO$, $Fe_3O_4$ or $NiO$. In exemplary embodiments, the one or more types of adsorbent media comprise $Al(OH)_3$. In exemplary embodiments, the adsorbent media comprises one or more types of adsorbent media that adsorb sulfur-containing compounds and produces a metal sulfide, for example $FeS$ and $Fe_2S$; alkaline earth sulfide, for example $CaS$; or another sulfide such as $ZnS$ or $SnS$.

In exemplary embodiments, the process gas does not comprise oxygen and the adsorbent media comprises one or more types of adsorbent media that adsorb sulfur-containing compounds and produces a metal sulfide, for example $FeS$ and $Fe_2S$; alkaline earth sulfide, for example $CaS$; or another sulfide.

Process Reaction Vessel

In exemplary embodiments, the apparatus and methods optionally further comprise a process reaction vessel. In exemplary embodiments, the process reaction vessel comprises a closed vessel or reactor with inlets for the waste feed 11, fluidizing or jet gas 10, co-reactants and/or inert bed media 13; outlets for the process gas and waste residues 12; and a lower portion of the vessel suitable for containing a bed comprising co-reactants and waste. In exemplary embodiments, the process reaction vessel is where the waste is subjected to initial pyrolysis. In exemplary embodiments, the process gas and waste residues (or pyrolyzed waste solids and waste gases) are transferred to a reaction vessel comprising a filter after treatment in the process reaction vessel. In certain embodiments, a reactive gas can be added to the process reaction vessel to gasify carbon in the radioactive waste. In certain embodiments, the process reaction vessel is the first of two vessels used for pyrolysis in the apparatus or methods for the treatment of radioactive waste comprising organic compounds, and sulfur-containing compounds and/or halogen-containing compounds.

In exemplary embodiments, the minimum operating temperature for the process reaction vessel is about 35° C., about 150° C., about 250° C., or about 350° C. In exemplary embodiments, the minimum operating temperature for the process reaction vessel is the temperature at which the evaporation or pyrolysis of the organic compounds in the waste occurs, for example about 35° C. when the waste comprises low-boiling organic solvents, or at least about 350° C. when the waste comprises wood, resins, PVC plastics or other long-chain organic polymers.

In exemplary embodiments, the maximum operating temperature for the process reaction vessel is about 1050° C., about 884° C., about 801° C., about 602° C., about 600° C., about 420° C., or about the temperature at which the sulfides, sulfates, sulfites and/or halide compounds formed from reaction with the one or more co-reactants and the waste begin to decompose or melt.

In exemplary embodiments, the temperature of the process reaction vessel is in the range of about 150° C. to about 1050° C., or about 150° C. to about 800° C.

In exemplary embodiments, the process reaction vessel is used to treat radioactive waste comprising ion exchange resin. In exemplary embodiments, when the process reaction vessel is used to treat ion exchange resin, the operating temperature for the process reaction vessel is in the range of about 250° C. to about 800° C., or about 350° C. to about 600° C.

In exemplary embodiments, the process reaction vessel can operate at a slight negative pressure or at positive pressures, for example a pressure of about 7 to about 115, about 10 to about 25, or about 12 to about 20 psia.

In exemplary embodiments, the fluidizing or jet gas for the partially fluidized or jetted bed of the process reaction vessel comprising co-reactants and waste is, for example, steam, hydrogen, oxygen, methane, ammonia, carbon dioxide, carbon monoxide, inert gases, oxidizing gases, reducing gases, nitrogen, volatile organic vapors, and mixtures thereof. In certain embodiments, steam is introduced into the process reaction vessel. In certain embodiments, steam is not introduced into the process reaction vessel. In certain embodiments, the fluidizing or jet gas is not a reducing gas.

In certain embodiments, the bed in the lower portion of the process reaction vessel is partially fluidized. Partially fluidized beds are described above. In certain embodiments, the bed in the lower portion of the process reaction vessel is jetted. In certain embodiments, the bed in the lower portion of the process reaction vessel is not fluidized. In certain embodiments, fluidizing or jet gas is not added to the bed in the lower portion of the process reaction vessel. In certain embodiments, the bed in the lower portion of the process reaction vessel is agitated mechanically. In certain embodiments, the bed in the lower portion of the process reaction vessel is agitated mechanically and is not fluidized or jetted. In exemplary embodiments, the partially fluidized or jetted bed comprising co-reactants and waste further comprises inert bed media, for example inert ceramic media such as silica, mullite, corundum, corderite, or alumina; and other types of inert media, such as bauxite, quartz or silica sand. In certain embodiments, the inert bed media comprises bauxite. In certain embodiments, the inert bed media comprises alumina beads. The size of the inert bed media beads is in the range of about 100 to about 5000 microns, or about 200 to about 1000 microns, in diameter. Such size beads do not easily elutriate out of the vessel and therefore minimize carryover. In certain embodiments, the inert bed media does not comprise alumina. In certain embodiments, the partially fluidized or jetted bed comprising co-reactants and waste does not comprise inert bed media.

In certain embodiments, the partially fluidized or jetted bed of the process reaction vessel comprises an oxidizing zone or portion. In certain embodiments, the partially fluidized or jetted bed of the process reaction vessel does not contain a reducing, or oxygen-starved, zone or portion. In exemplary embodiments, the process reaction vessel can be operated under oxidizing conditions. In exemplary embodiments, the process reaction vessel can be operated under reducing conditions. In exemplary embodiments, the process reaction vessel are not operated under reducing conditions.

In exemplary embodiments, the process reaction vessel can be used to substantially reduce the carbon content of the radioactive waste. In exemplary embodiments, when the waste is first treated in the process reaction vessel, the subsequent treatment of the waste in the reaction vessel comprising a filter can be used to remove sulfur-containing compounds and/or halogen-containing compounds and to further reduce the carbon content of the waste.

From the description, it will be appreciated that embodiments of the present technology overcome limitations of the prior art. Those skilled in the art will appreciate that the present technology is not limited to any specifically discussed application or implementation and that the embodiments described herein are illustrative and not restrictive. From the description of the exemplary embodiments, equivalents of the elements shown therein will suggest themselves to those skilled in the art, and ways of constructing other embodiments of the present technology will appear to practitioners of the art.

We claim:

1. A method for treating radioactive waste comprising organic compounds, and sulfur-containing compounds and/or halogen-containing compounds, the method comprising:
   (a) adding radioactive waste comprising organic compounds, and sulfur-containing compounds and/or halogen-containing compounds; and one or more co-reactants to a reaction vessel comprising a filter to form a bed in the lower portion of the reaction vessel comprising a filter;
   (b) heating the reaction vessel comprising a filter to a temperature of in the range of about 250° C. to about 1050° C. to form pyrolyzed radioactive waste residues and waste gases;
   (c) agitating, partially fluidizing or jetting the bed of the reaction vessel comprising a filter;
   (d) optionally, adding a reactive gas to the reaction vessel to gasify carbon in the pyrolyzed waste residues;
   (e) removing pyrolyzed radioactive waste residues from the reaction vessel comprising a filter for disposal; and
   (f) transferring the waste gases from the reaction vessel comprising a filter to a thermal oxidizer for combustion;
   wherein the reaction vessel comprising a filter may optionally be heated to a temperature of in the range of about 250° C. to about 1050° C. prior to step (a).

2. The method of claim 1, wherein step (b) may be carried out prior to step (a).

3. The method of claim 1, wherein step (d) comprises adding a reactive gas to the reaction vessel comprising a filter to gasify carbon in the pyrolyzed waste residues.

4. The method of claim 3, wherein the step of adding a reactive gas to gasify carbon in the pyrolyzed waste residues is carried out at a temperature below that which the sulfur-containing compounds and/or halogen-containing compounds volatilize.

5. The method of claim 1, wherein the waste and the one or more co-reactants are heated to a temperature of about 884° C. or less to prevent decomposition or melting of sodium sulfate.

6. The method of claim 1, wherein the waste and the one or more co-reactants are heated to a temperature of about 602° C. or less to prevent decomposition of $Fe_2S$.

7. The method of claim 1, wherein the waste and the one or more co-reactants are heated to a temperature of about 1050° C. or less to prevent decomposition of calcium sulfide or zinc sulfide.

8. The method of claim 1, wherein the waste and the one or more co-reactants are heated to a temperature of about 801° C. or less to prevent decomposition or melting of sodium chloride.

9. The method of claim 1, wherein the bed contains inert bed media.

10. The method of claim 1, wherein the bed does not contain inert bed media.

11. The method of claim 1, wherein the method further comprises transferring the waste gases to an adsorption vessel comprising adsorbent for adsorbing sulfur-containing compounds and/or halogen-containing compounds prior to transferring the waste gases to a thermal oxidizer for combustion.

12. The method of claim 1, wherein the reaction vessel comprising a filter comprises the waste, one or more co-reactants and optionally, inert bed media.

13. The method of claim 1, wherein the bed in the lower portion of the reaction vessel comprising a filter is jetted.

14. The method of claim 1, wherein the temperature of the reaction vessel comprising a filter is below the temperature at which the sulfur-containing compounds and/or halogen-containing compounds volatilize.

15. The method of claim 1, wherein the bed in the lower portion of the reaction vessel comprising a filter is a bed of solids that is agitated by localized introduction of jet gas and the jet gas induces mixing of the solids without fluidizing the bulk of the solids.

16. The method of claim 1, wherein the reaction vessel comprising a filter comprises an oxidizing zone or portion.

17. The method of claim 1, wherein the reaction vessel comprising a filter comprises an oxidizing gas.

18. A method for treating radioactive waste comprising organic compounds, and sulfur-containing compounds and/or halogen-containing compounds, the method comprising:
   (a) adding radioactive waste comprising organic compounds, and sulfur-containing compounds and/or halogen-containing compounds; and one or more co-reactants to a process reaction vessel to form a bed in the lower portion of the process reaction vessel;
   (b) heating the process reaction vessel to a temperature in the range of about 35° C. to about 1050° C.;
   (c) agitating, partially fluidizing or jetting the bed while maintaining the temperature of the process reaction vessel in the range of about 35° C. to about 1050° C. to form fully or partially pyrolyzed radioactive waste residues and waste gases;
   (d) transferring the fully or partially pyrolyzed radioactive waste residues and waste gases from the process reaction vessel to a reaction vessel comprising a filter to form a bed in the lower portion of the reaction vessel comprising a filter;
   (e) heating the reaction vessel comprising a filter to a temperature in the range of about 250° C. to about 1050° C.;
   (f) agitating, partially fluidizing or jetting the bed of the reaction vessel comprising a filter while maintaining the temperature of the reaction vessel comprising a filter in the range of about 250° C. to about 1050° C. to form fully or partially pyrolyzed radioactive waste residues and waste gases;

(g) optionally, adding a reactive gas to the reaction vessel comprising a filter to gasify carbon in the partially pyrolyzed waste residues;

(h) removing the fully pyrolyzed radioactive waste residues from the reaction vessel comprising a filter for disposal; and (i) transferring the waste gases from the reaction vessel comprising a filter to a thermal oxidizer for combustion;

wherein the process reaction vessel may optionally be heated to a temperature in the range of about 35° C. to about 1050° C. prior to step (a); and wherein the reaction vessel comprising a filter may optionally be to heated to a temperature in the range of about 250° C. to about 1050° C. prior to step (d).

19. The method of claim 18, wherein step (b) may be carried out prior to step (a).

20. The method of claim 18, wherein step (e) may be carried out prior to step (d).

21. The method of claim 18, wherein the process reaction vessel is heated to a temperature in the range of about 250° C. to about 1050° C.

22. The method of claim 18, further comprising adding a reactive gas to the reaction vessel comprising a filter in step (g) to gasify carbon in the pyrolyzed waste residues.

23. The method of claim 22, wherein the step of adding a reactive gas to gasify carbon in the pyrolyzed waste residues is carried out at a temperature below that which the sulfur-containing compounds and/or halogen-containing compounds volatilize.

24. The method of claim 18, wherein the waste and the one or more co-reactants are heated to a temperature of about 884° C. or less to prevent decomposition or melting of sodium sulfate.

25. The method of claim 18, wherein the waste and the one or more co-reactants are heated to a temperature of about 602° C. or less to prevent decomposition of $Fe_2S$.

26. The method of claim 18, wherein the waste and the one or more co-reactants are heated to a temperature of about 1050° C. or less to prevent decomposition of calcium sulfide or zinc sulfide.

27. The method of claim 18, wherein the waste and the one or more co-reactants are heated to a temperature of about 801° C. or less to prevent decomposition or melting of sodium chloride.

28. The method of claim 18, wherein the bed contains inert bed media.

29. The method of claim 18, wherein the bed does not contain inert bed media.

30. The method of claim 18, wherein the method further comprises transferring the waste gases to an adsorption vessel comprising adsorbent for adsorbing sulfur-containing compounds and/or halogen-containing compounds prior to transferring the waste gases to a thermal oxidizer for combustion.

31. The method of claim 18, wherein the reaction vessel comprising a filter comprises the waste, one or more co-reactants and optionally, inert bed media.

32. The method of claim 18, wherein the bed in the lower portion of the reaction vessel comprising a filter is jetted.

33. The method of claim 18, wherein the temperature of the reaction vessel comprising a filter is below the temperature at which the sulfur-containing compounds and/or halogen-containing compounds volatilize.

34. The method of claim 18, wherein the bed in the lower portion of the reaction vessel comprising a filter is a bed of solids that is agitated by localized introduction of jet gas and the jet gas induces mixing of the solids without fluidizing the bulk of the solids.

35. The method of claim 18, wherein the reaction vessel comprising a filter comprises an oxidizing zone or portion.

36. The method of claim 18, wherein the reaction vessel comprising a filter comprises an oxidizing gas.

* * * * *